US009836805B2

(12) United States Patent
Rau et al.

(10) Patent No.: US 9,836,805 B2
(45) Date of Patent: Dec. 5, 2017

(54) SYSTEM FOR SEARCH AND CUSTOMIZED INFORMATION UPDATING OF NEW PATENTS AND RESEARCH, AND EVALUATION OF NEW RESEARCH PROJECTS' AND CURRENT PATENTS' POTENTIAL

(71) Applicant: SACKETT SOLUTIONS & INNOVATIONS, LLC, Houston, TX (US)

(72) Inventors: Nemoy Rau, Houston, TX (US); Hans Rau, Fishers, IN (US); Krishna Mantripragada, Munice, IN (US); Nagesh Paila, Bangalore (IN); Venkata Sivashankar, Chennai (IN)

(73) Assignee: SACKETT SOLUTIONS & INNOVATIONS, LLC, Houston, TX (US)

( * ) Notice: Subject to any disclaimer, the term of this patent is extended or adjusted under 35 U.S.C. 154(b) by 0 days.

(21) Appl. No.: 14/942,882

(22) Filed: Nov. 16, 2015

(65) Prior Publication Data

US 2016/0232246 A1    Aug. 11, 2016

Related U.S. Application Data

(63) Continuation-in-part of application No. 13/744,231, filed on Jan. 17, 2013, now abandoned.

(Continued)

(51) Int. Cl.
*G06F 17/30* (2006.01)
*G06Q 50/18* (2012.01)

(52) U.S. Cl.
CPC ..... *G06Q 50/184* (2013.01); *G06F 17/30672* (2013.01)

(58) Field of Classification Search
CPC ................. G06Q 50/184; G06F 17/30672
See application file for complete search history.

(56) References Cited

U.S. PATENT DOCUMENTS

2002/0091543 A1* 7/2002 Thakur .................. G06Q 10/10
705/310
2002/0138474 A1* 9/2002 Lee ........................ G06Q 10/10
(Continued)

OTHER PUBLICATIONS

Users Manual for the Examiners Automated Search Tool (EAST) 2.1, United States Patent and Trademark Office, May 5, 2006.*

*Primary Examiner* — Jay Morrison (57) ABSTRACT

The embodiments herein relate to intellectual property management and, more particularly, to a tool for searching and evaluating relative commercial potential of an invention. A user may select any of the services such as search, draft, innovation evaluation, commercial potential evaluation and so on. A search tool automatically generates a key string based on user inputs, searches in associated databases, organizes search results and delivers to the user. The keywords are improved or modified automatically by the search tool so as to improve subsequent search results. The keywords are improved by considering parameters such as field of search, search history of the user and so on. Further, new keywords are added to a dictionary so as to improve search strings each time. Drafting tools may be used to draft patent applications in specific format. Further, a research commercialization evaluator is used to analyze commercial potential of an invention.

37 Claims, 8 Drawing Sheets

Related U.S. Application Data

(60) Provisional application No. 61/587,434, filed on Jan. 17, 2012.

(56) References Cited

U.S. PATENT DOCUMENTS

| | | | |
|---|---|---|---|
| 2006/0235843 A1* | 10/2006 | Musgrove | G06F 17/30616 |
| 2007/0011134 A1* | 1/2007 | Langseth | G06F 17/30563 |
| 2007/0294232 A1* | 12/2007 | Gibbs | G06F 17/30637 |
| 2010/0287148 A1* | 11/2010 | Resnick | G06F 17/30011 707/706 |
| 2010/0293174 A1* | 11/2010 | Bennett | G06F 17/30707 707/759 |

\* cited by examiner

ND CUSTOMIZED
SYSTEM FOR SEARCH AND CUSTOMIZED INFORMATION UPDATING OF NEW PATENTS AND RESEARCH, AND EVALUATION OF NEW RESEARCH PROJECTS' AND CURRENT PATENTS' POTENTIAL

This application is a continuation-in-part of U.S. patent application Ser. No. 13/744,231, filed on Jan. 17, 2013, which claims priority to a U.S. Provisional Application No. 61/587,434, filed Jan. 17, 2012, the contents of which in its entirety are herein incorporated by reference.

TECHNICAL FIELD

The embodiments herein relate to intellectual property management and, more particularly, to a tool for searching and evaluating the relative commercial potential of an invention.

BACKGROUND

Generally, scholarly research is a formal work undertaken to gain knowledge of various subjects, aspects and facts in order to solve a new or existing problem. A research work may provide a detailed insight on any subject of interest to the researcher. The process of performing research work may include steps such as; Identification of research problem, Literature review, Specifying the purpose of research, Determine specific research questions or hypotheses, Information collection, Analyzing and interpreting the information and Reporting and evaluating research. Hence, a researcher requires up to date information on research being conducted in one's field of specialization.

During the research process, a researcher may use various primary sources and methods of information collection through surveys, questionnaires and so on. The researcher may also use secondary data obtained from previously done research work, facts and figures available on the Internet and so on. Hence, the researcher has to search for the relevant content in various sources of information to get the required details.

Presently, the most common source for performing a search is the internet. For the purposes of performing a search, a researcher has to efficiently select and use certain keywords that are relevant to his study of interest. Due to insufficient knowledge and lack of hands-on experience on online searching techniques, search processes become complicated tasks for the researchers. Also, ever increasing amounts of information generated and collected on the Internet increases the time spent by a researcher in just sorting through large volumes of results returned for each search query. Many such queries may be necessary to collect relevant research citations, papers, reports, and other data sources as a part of the background research literature collection process. Choosing and saving the relevant output results of each search query requires large amounts of researcher's time, thereby handicapping the researcher's ability in considering all the relevant items displayed for each search query.

Unlike regular and general searches, keywords used by researchers and academicians for research purposes need to be appropriate in order to extract relevant and intended/sought for search results. It is a known fact that many research papers which may be useful to researchers may not have been published in professional journals yet or such research may be still in progress as different types of working papers presented in conferences or uploaded on to the Internet through faculty personal pages, research workshops, university or research institution working paper forums, etc. These papers may be very valuable for researchers working in that area of in depth specializations. More commonly used academic research databases do not include most of such research works. Also, with keyword search methods and techniques commonly used in user initiated searches, it is difficult to access research that has not yet appeared in peer reviewed and other journals.

SUMMARY

In view of the foregoing, an embodiment herein provides a method of performing a scholarly search using a search tool. The method comprises processing a search query to identify at least one of a keyword using a search tool; identifying at least one of a class and subclass corresponding to the identified keyword using the search tool; fetching additional words from a dictionary that matches at least one of the identified class, subclass and keyword using the search tool; organizing the identified keywords and the fetched additional words using the search tool; searching in at least one of a plurality of databases using the framed search string using the search tool and displaying search results to the user using an interface module.

Embodiments further disclose a system for performing a scholarly search using a search tool. The system is configured for processing a search query to identify at least one keyword using a search tool; identifying at least one class and subclass corresponding to the identified keyword using the search tool; fetching additional words from a dictionary that matches at least one of the identified class, subclass and keyword using the search tool; organizing the identified keywords and the fetched additional words using the search tool; searching in at least one of a plurality of databases using the framed search string using the search tool; and displaying search results to the user using an interface module.

These and other aspects of the embodiments herein will be better appreciated and understood when considered in conjunction with the following description and the accompanying drawings.

BRIEF DESCRIPTION OF THE FIGURES

The embodiments herein will be better understood from the following detailed description with reference to the drawings, in which.

DETAILED DESCRIPTION OF EMBODIMENTS

The embodiments herein and details regarding various features and advantages thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a system and associated methods to enable intellectual property management using automated search and drafting processes.

The terms category (and sub-category) and class (and sub-class) are used interchangeably throughout the document.

In a preferred embodiment, the system discloses through a search tool that enables processing a search query to identify one or more keywords, identifying at least one class or a class/sub-class combination corresponding to the identified keywords, fetching additional words from a dictionary that match the class or class/sub-class combination, framing a key string using the keywords and the additional words, searching in at least database using the key string, and displaying search results to user using an interface module.

In a preferred embodiment, the system allows abstracts to be provided as a search query input as opposed to only allowing limited set of keywords in a particular combination. The search query can be a free form text as used in academic publications. For example, a researcher trying to find papers relevant to a paper that he is already reading, can simply input the entire abstract of his current paper without having to worry about simplifying the text to a limited set of keywords, or building a query using the keywords in a particular combination with logic operators.

In a preferred embodiment, the categories are not static across the system. In existing systems, it is common for databases to be organized based on well-established and standardized ontologies. However, such an approach makes organization of data complex, and retrieval unreliable. In contrast, the proposed system employs an approach where the categories are identified based on the target audience of the system, and is system user-specific. In one example, categories may be defined according to the functional organization of departments and sub-departments where the system user is a university. A system user may have one or more associated individual and group users. In another example, categories can be organized according to the research interests of research scholars a particular research institution, where the system user is the research institute. In yet another example, categories can be organized based on verticals and horizontals as used by various corporate organizations to organize their research.

In a preferred embodiment, the system allows users to configure the categorization technique to be used. In various example embodiments, categories may be arrived at using a combination of approaches—subject ontologies, departments, research interests, business units and so on.

In a preferred embodiment, each category is associated with a core definition (also referred to as nucleus of the category to denote a distinctive characteristic or set of characteristics). The system performs a search by constructing a nucleus for incoming text and matching the nucleus with those associated with existing categories in a database. A nucleus (associated with a category or a sub-category) can include (a) words having positive association with the category, (b) words negatively associated with the category, (c) phrases or groups of loosely coupled words (typically, appearing in close proximity) that are positively associated with the category, and (d) phrases or group of loosely coupled words (typically, appearing in close proximity) that are negatively associated with the category.

In various embodiments, nucleus can also include information not related to subject ontologies, including but not limiting to (a) level of appropriateness of a document (Primary, Middle level or Advanced), (b) type of subject matter (Process, technology, design etc.), (c) commercial viability (Excellent, Average or Poor), (d) probability of obtaining a grant from a specific organization, (e) meta data derived from user preferences for user specific refinement of search results.

In a preferred embodiment, a nucleus is a pre-defined structure defined to represent a category.

In various embodiments, nucleus for a category can be a pre-constructed query built using a combination of words and phrases that are either positively associated or negatively associated, and binary operators such as 'AND', 'OR', 'NOT' etc. The plurality of nuclei can be stored in a nucleus repository that can be same or separate from the repository with category information.

In a preferred embodiment, pre-configured nucleus may be provided for each category in the database of the system. The pre-configured nucleus can be derived automatically or semi-automatically by a training process where a set of training documents are provided to the system to learn and construct the nucleus. The documents for training may be identified by experts or may be obtained from an external or internal database that is appropriately classified. As users search for information on the system, the system can dynamically update the nucleus through various machine learning approaches available.

In various embodiments, the system can identify new nucleus elements that are not present in the current nucleus and may be occurring more often in the new documents, and thereby add or suggest adding new elements to the nucleus. Further, the system can also identify obsolete nucleus elements that are not frequently occurring in the new documents, and thereby remove or suggest removing nucleus elements that are not relevant anymore.

In a preferred embodiment, the system can suggest a new category when it finds no match for incoming text with any of the existing nuclei from the repository. In various embodiments, the system can either automatically create a new category associated with the nucleus or allow a system administrator to review and add a new category associated with the nucleus. Further, the system can also analyze the database and activity on a periodic basis, and provide recommendations on categories that may not be required or that are used infrequently compared to others. The system can suggest removal of such categories. A system administrator can review such reports and recommendations, and take necessary action with the help of subject matter experts. Such dynamic modification and revision of nucleus and categories can result in splitting categories that are overly broad into more specific categories, or even merging of overly narrow categories into more logically grouped categories.

In a preferred embodiment, the system allows users to provide match rating for search results. The system can use the match rating provided by users to various search results, and update the nucleus of the relevant category or categories.

In various embodiments, the system may allow system administrators and knowledge experts to edit one or more nuclei according to user preferences. This is particularly useful where machine learning is not enough or is not adequate in certain domains.

The following paragraphs describe the embodiments in further detail with appropriate references to the attached drawings, more particularly to FIGS. 1 to 6, where similar reference characters denote corresponding features throughout.

Figure 1:
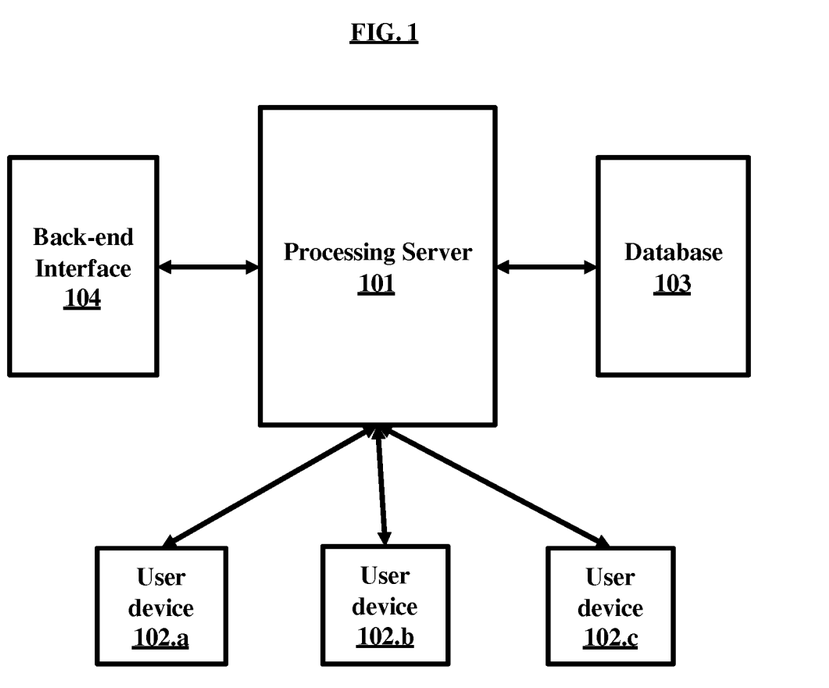
FIG. 1 illustrates a system architecture of the search system, as disclosed in the embodiments herein.

FIG. 1 illustrates system architecture of the search system, as disclosed in the embodiments herein. The system comprises of a processing server 101, a plurality of user devices 102, databases 103 and a back-end interface 104. The user device 102 may be a device such as a laptop, tablet PC, a mobile phone or any other device which may connect and access services of the processing server 101. In one embodiment, the user device 101 may access the processing server 101 using a web browser. In another embodiment, the user device 101 may access services of the processing server 101 through a client application installed on the user device 101.

Further, the database 103 may comprise of internal and/or external databases. For example, the processing server 101 may be connected and configured to access information available in external databases such as USPTO, IEEE, Google Scholar and so on. The internal database may refer to a database that is maintained in the processing server 101. The database 103 may comprise both patent and non-patent literature such as published and unpublished research literature, existing patents and academic research papers and so on. The database may store and provide research papers in various stages of completion such as working papers, published papers, proceedings, symposia, conference papers and so on, listed under different categories for ease of access.

In a preferred embodiment, the internal database may be configured to access websites of universities, research institutes and government databases and so on and may then access database of research works, linked with the website. Whenever a new research project is added to the internal database, the new research project is assigned a unique key. Further, the search system may automatically update the status of the research project in set time intervals. In another embodiment, an authorized person such as an administrator may manually update contents of the internal database. The data in the databases 103 are categorized and stored in different sets of classes based on a plurality of factors, wherein the plurality of factors comprise of field of study of the invention and/or, title of invention, and/or, technology being used, and so on. In an embodiment, the categories are identified based on the target audience of the system, and are specific to the system user. In an embodiment, each category is associated with a core definition (also referred to as nucleus of the category). The system performs a search by constructing the nucleus for incoming text and matching the nucleus with those associated with existing categories in a database. The nucleus (associated with a category or a sub-category) can include (a) words having positive association with the category, (b) words negatively associated with the category, (c) phrases or groups of loosely coupled words (typically, appearing in close proximity) that are positively associated with the category, and (d) phrases or group of loosely coupled words (typically, appearing in close proximity) that are negatively associated with the category.

In an embodiment, the nucleus is a pre-defined structure defined to represent a category. An example structure of the nucleus for nanotechnology is shown the table below.

| S. No | Phrase/Word | GO/NO-GO | Weight |
|---|---|---|---|
| 1 | Nanotech | GO | 100 |
| 2 | Nanotechnology | GO | 100 |
| 3 | Quantum relm | GO | 50 |
| 4 | Nanoscale | GO | 75 |
| 5 | Molecular self assembly | GO | 100 |
| 6 | Nanotubes | GO | 100 |
| 7 | Nanoparticles | GO | 50 |
| 8 | Molecular recognition | GO | 100 |
| 9 | Nanomaterials | GO | 100 |
| 10 | Molecular machine | GO | 100 |
| 11 | Quantum mechanics | NOGO | 100 |
| 12 | Quantum | NOGO | 50 |
| 13 | Relativity | NOGO | 100 |

A user of a user device 102 could be an inventor, a researcher, an academician or any other professional who may be require certain knowledge on a particular subject. The user may select any of the services such as searching for patents and research literature works, drafting, research commercial evaluation and innovation evaluation and so on. Upon receiving the user instructions related to performing a specific task/process, the processing server 101 processes the instructions and choices opted by the user. For example, if the user selects the searching option, the processing server 101 will prompt the user for certain details such as field of research, title of the study/invention and so on. The user can provide abstracts as a search query input as opposed to only allowing limited set of keywords in a particular combination. The search query can be a free form text as used in academic publications.

Once the user provides the required details, the processing server 101 searches the associated databases 103 for the required content, which is then retrieved and displayed to the users. According to a user's requirements, the processing server 101 may also generate consolidated reports and dispatch them to the user. Similarly, the processing server 101 performs drafting, commercial potential evaluation and so on, based on user instructions/inputs.

In an attempt to provide error-free reliable reports to the user, the system is facilitated with a back-end interface 104 connected to the processing server 101, which may be used by an expert team to evaluate and analyze the system generated reports. The system provides an option to the users, wherein the users may opt for an evaluation from an expert team for the reports generated by the system. This mechanism allows an expert team, proficient in the subject knowledge of the invention/research field to access the system generated reports through the back-end interface 104 and thereby analyze and evaluate the reports. After evaluation, the reports are dispatched to the user through the processing server 101.

The search system may also be used to manage portfolios of patents as well as non-patent literature of any organization, university and so on. The portfolio management functionality may be used to obtain automated reminders regarding various deadlines such as patent filing date and so on, so as to enable better management of patents as well as in development process of intellectual property. The user may feed specific inputs, based on which the portfolio management system may generate or provide specific alerts or reminders at specific time intervals. For example, consider that the user enters the filing date of a provisional patent application as the input to the portfolio management system. Then the portfolio management system may generate an alert to remind the user of the complete application filing date, before a pre-defined time interval; say 2 months. The pre-defined time interval may be defined by the user.

Figure 2:
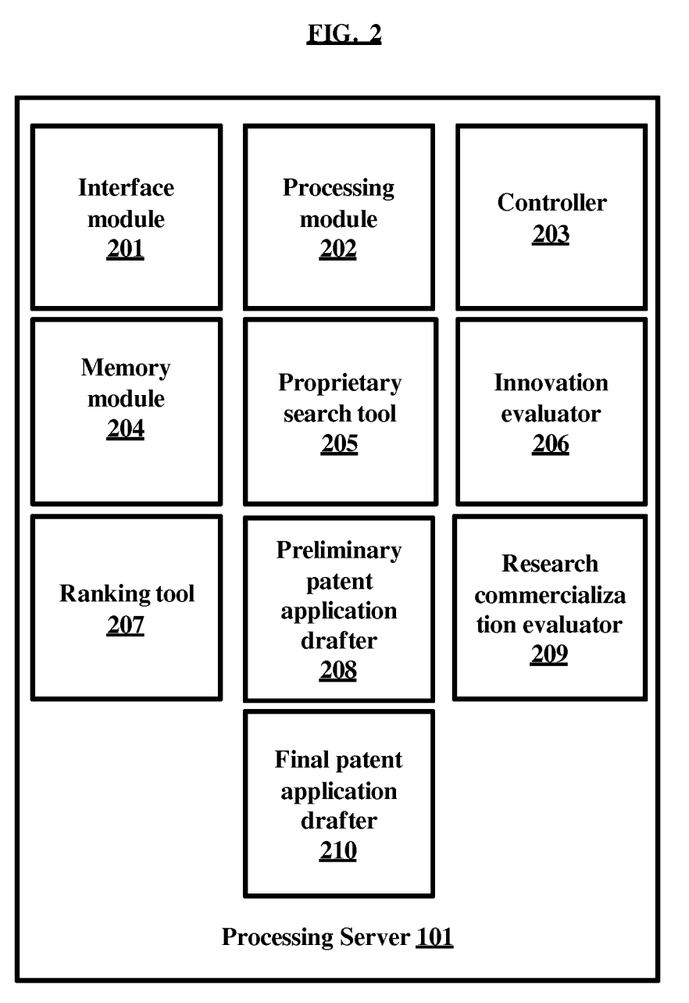
FIG. 2 is a block diagram that illustrates various components of the processing server, as disclosed in the embodiments herein.

FIG. 2 illustrates a block diagram of a processing server, according to the embodiments as disclosed herein. The processing server 101 comprises of an interface module 201, a processing module 202, a controller 203, a memory module 204, a search tool 205, an innovation evaluator 206, a ranking tool 207, a preliminary patent application drafter 208, a final patent application drafter 209 and a research commercialization evaluator 210. The interface module 201 connects the processing server 101 to user devices 102, database 103 and back end interface 104. The interface module 201 serves as the interface between the processing server 101 and enables the user to give inputs. The interface module 201 receives and passes the user inputs from the user device 102 to the processing module 202. The processing module 202 processes the received user inputs, decides the course of action based on received inputs and instructs the control module 203 to perform action (s) corresponding to the identified course of action. For example, if the user input refers to performing a search, the processing module 202 instructs the control module 203 accordingly, which then initiates a corresponding tool, i.e., search tool 205 to perform the search operation.

The search tool 205 utilizes an algorithm to search prior arts from various resources associated with the database 103. The search tool 205 accepts invention/research specific terms as input from the user. In a preferred embodiment, the search tool 205 frames key strings using the received inputs and searches in the associated database 103 for matching results. The search result may comprise of issued patents, project summaries, abstracts and so on. The search tool 205 may also generate consolidated reports using a search algorithm to screen, filter, remove redundancies, combine, and reorganize the search results. In a preferred embodiment, the algorithm used by the search tool 205 is a self-learning algorithm that learns user preferences, domain of interest and so on, based on search keywords related to the input being provided by the user and search results being accessed by the user. Further, based on the information on search keywords being provided by the user and search results being accessed by the user, the search tool 205 may modify the search key strings each time to provide more relevant search results. In another embodiment, the system may use answers filled by the user in response to a few questions in a questionnaire document, so as to identify a field of interest of that particular user.

The innovation evaluator 206 may be used to evaluate commercial/business potential of an invention by applying rank ordering, measuring and other ranking techniques to the consolidated search outputs. The innovation evaluator 206 ranks the related and similar prior arts based on criteria such as number of patents issued in a particular field of study, number of products using such technologies and so on. The reports are dispatched to the user for his approval. The innovation evaluation report may possess detailed analysis on commercial/business potential of the invention or field of research.

The ranking tool 207 may be used to analyze ranking order of any invention based on field of research of that particular invention. The ranking tool 207 may analyze ranking order of an invention or a field of research based on specific parameters such as activity in a class in the database 103 corresponding to that particular invention.

The preliminary patent application drafter 208 and the final patent application drafter 210 may be used for drafting a specification draft and a complete draft respectively based on user inputs. The drafting tools set contains drafting templates suitable for various patent receiving authorities such as USPTO, WIPO, EPO and so on and drafts a specification using the appropriate template to enable the user to file the draft with the selected authority. The drafting tools may be used to draft various parts of the patent specification such as field of invention, brief description of invention, detailed description of invention and claims and so on, based on type of the draft.

The research commercialization evaluator 209 is a tool that accepts an existing patent, patent application or preliminary application as input and performs a detailed search in the associated databases to analyze and obtain information on companies using a similar process as claimed in the input patent application, products, techniques, or technologies related to the ones contained in the input and so on. The research commercialization evaluator 209 also provides a multidimensional innovation value evaluation matrix and/or a descriptive value analysis report on request. These outputs may be used by the organization or user to evaluate the potential value of a proposed new patent and to decide whether further commercial and/or academic development is to be pursued in that particular field.

Figure 3:
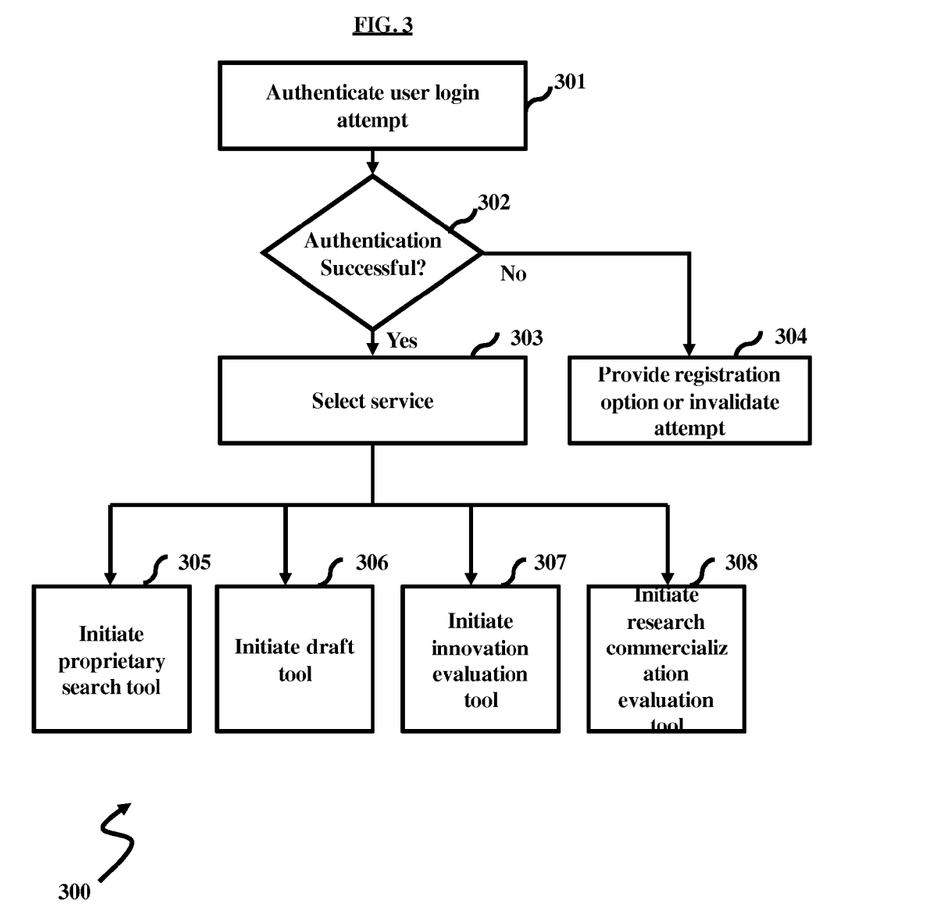
FIG. 3 is a flow diagram that shows various steps involved in the process of initiating service based on user input, as disclosed in the embodiments herein.

FIG. 3 is a flow diagram that shows various steps involved in the process of initiating service based on user input, as disclosed in the embodiments herein. A user may access services offered by the processing server 101 using his/her user device 102. The user may either access the services through a website using a web browser or using a client application installed on the user device 102, which in turn is connected to the processing server 101 using a suitable connection means.

In a preferred embodiment, the user may access the services of the processing server 102 only after a valid authentication procedure. The processing server 102 may authenticate (301) the user by comparing login information provided by the user with data fetched and stored in a database during a user registration process. If the authentication fails, the user is provided with option to register with the service or the access attempt is invalidated (304) and terminated.

Upon successful authentication, the user is permitted to select (303) service he/she wants to use. If the user selects the search service, the system initiates (305) the search tool 205. If the user selects the drafting service, the system initiates (306) the preliminary patent application drafter 208 or the final patent application drafter 210, as per the preferences of the user. If the user selects the innovation evaluation service, the system initiates (307) the innovation evaluator 206. If the user selects the research commercialization evaluation service, the system initiates (308) the research commercialization evaluator 209. The various actions in method 300 may be performed in the order presented, in a different order or simultaneously. Further, in some embodiments, some actions listed in FIG. 3 may be omitted.

Figure 4:
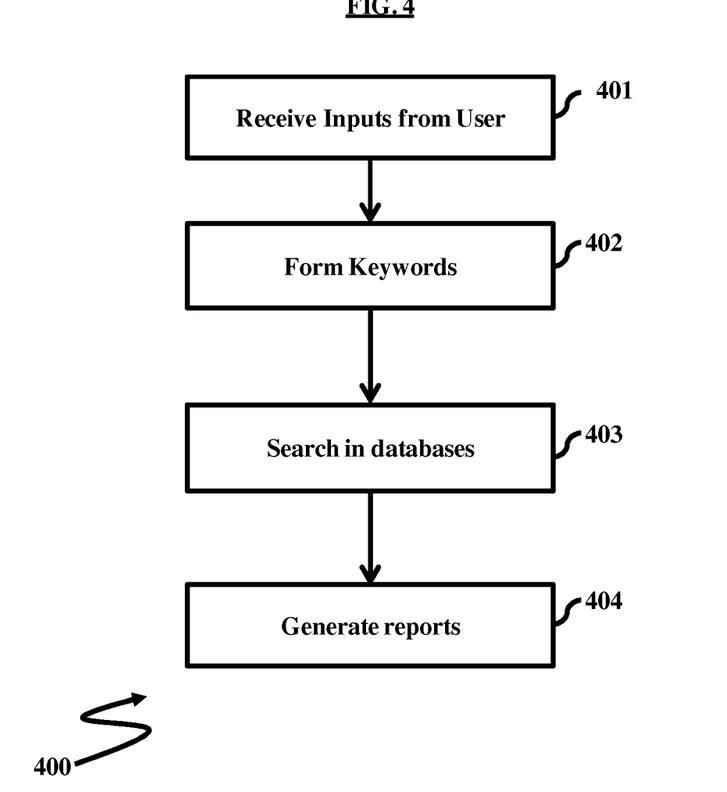
FIG. 4 is a flow diagram that shows various steps involved in the process of searching and retrieving results from databases, as disclosed in the embodiments herein.

FIG. 4 is a flow diagram that shows various steps involved in the process of searching and retrieving results from databases, as disclosed in the embodiments herein. When the user selects the search service, the processing server 101 initiates the search tool 205. The search tool 205 accepts (401) the input from the user, wherein the input may be any or all of a title of the invention/study, field of search/study, abstract of the invention, summary of the invention and so on. Upon receiving the user inputs, the search tool 205 processes the received inputs by removing stop words and redundant words.

Further, in a preferred embodiment, the search tool 205 processes the remaining words and forms (402) a key string. So as to form the key string from the received user inputs, the search tool 205 identifies at least one category in an associated dictionary, the remaining words fall under and forms a key string based on the identified class. In an embodiment, the search tool 205 may combine keywords identified from the user input and the additional terms identified from the dictionary corresponding to the identified class, to form the key string. The search algorithm in the search tool 205 may even add new keywords to the dictionary based on self-learning process and may improve relevancy of search results each time. In another embodiment, the user may manually add new keywords to the dictionary so as to improve relevancy of the search results. Further, the search tool 205 may also consider parameters such as relationships between the terms, strength in terms of ranking and so on while framing the key strings so as to ensure better/relevant search results.

Further, in a preferred embodiment, the search tool 205 may take the search results through multiple search passes during each search project. During each search pass, the search tool 205 analyzes results, search keys and so on of the previous pass and may amend the search key string based on relevancy of the search results obtained during the previous pass. The search tool 205 may use a plurality of weighing schema for refining the key strings after each pass. Further, information on user's search field, relevancy of previous search pass results and so on also may be considered for modifying or improving key strings after each pass. Further, during each search pass, the search tool 205 screens, filters, removes redundancies, combines and reorganizes key strings, so as to improve the relevancy of search results. The multiple passes may improve relevancy of the search results each time and the output of the final pass is dispatched/displayed to the user.

Further, the search tool 205 searches (403) in the associated databases 103 with the framed key string as the search string. In various embodiments, the search may be a periodic search or a special search, based on a class mapper. The class mapper may be defined as a function that measures correlation between document classification nodes in the database so as to improve relevancy of search results. Further, the search time may vary depending on type of data being searched or stored in the database 103. For example, the search tool 205 may take less time to search a database that comprises of structured data than a database 103 that comprises non-structured data. The structured data refers to a data being organized/arranged in a set format; whereas the non-structured data refers to data being arranged in no specific order. Further, during the search, the search tool 205 may compare input data fed by the user with data in the patent as well as non-patent literature available in the associated databases.

The search tool 205 may also possess options to display patents as well as non-patent literature in specific time intervals. For example, in response to a search query, the search tool 205 may fetch and display results arranged in the order of set options like date of publication, date of grant and so on, as set by the user. This may help the user to analyze and identify information such as number of patent application being filed during a selected time interval and so on, that may further help to analyze activity level in that particular field of search.

In an embodiment, the user may be provided with options to configure databases to be searched, time span, number of results to be displayed and so on. The search may retrieve prior arts, existing issued patents, academic research works and any other relevant contents in the external databases such as USPTO, WIPO and so on. The search results may be displayed to the user. In an embodiment, the search results may be organized based on specific criteria configured by the user.

In an embodiment, the user may select an in-built functionality of the search tool 205 to generate consolidated reports of the search results considering a few attributes such as number of similar patents, number of citations in each of the patent, and so on. The organized structure of the consolidated reports will aid the users in understanding the results more efficiently. The reports thus generated (404) may be dispatched to the user who may then use it to improve his/her invention and/or to proceed with a patenting process.

In another embodiment, the search tool 205 may associate identified search preferences of the user with the corresponding user profile and may analyze the history of the previous searches performed by the user, each time the user logs in to perform a new search. For example, when a user initiates a search process, the search tool 205 may consider history of user search, keyword and search result preferences and so on to improve search key strings and thereby relevancy of search results. The various actions in method 400 may be performed in the order presented, in a different order or simultaneously. Further, in some embodiments, some actions listed in FIG. 4 may be omitted.

Figure 5:
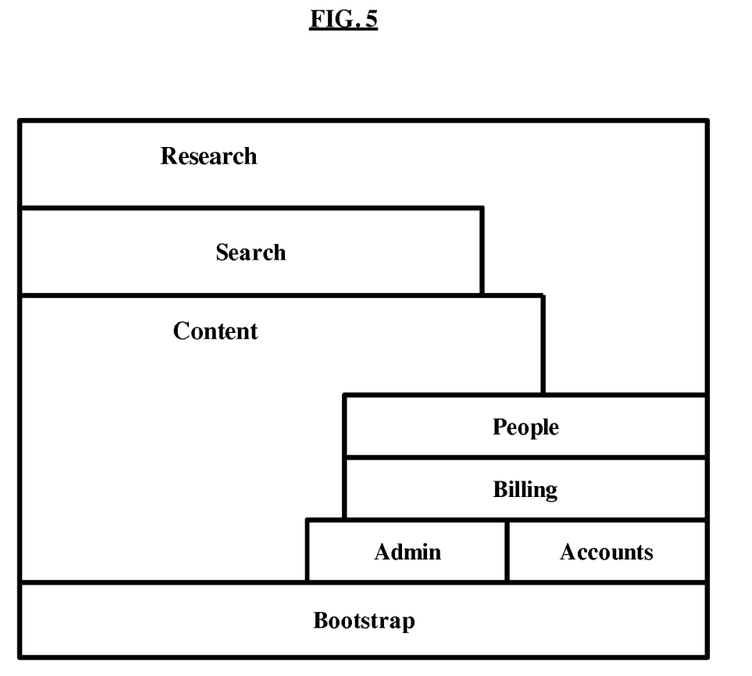
FIG. 5 shows a module stack of the search tool, as disclosed in the embodiments herein.

FIG. 5 shows a module stack of the search tool, as disclosed in the embodiments herein. The bootstrap module manages the configuration of the cluster and system resources. The admin module governs the business application resources such as logs, security and notification and the accounts module is a simple bookkeeping for the end users of the system. The billing module is similar to an invoice module that keeps track of bills and payments. The system users and the business users including the content authors are managed by the people module. Various sources of content with their structure and their storage are managed by the content module. Query parsers, indexes and responding to queries are done by the search module. Research is the main business module that teaches the search module on various taxonomy and dictionaries of terms.

Figure 6:
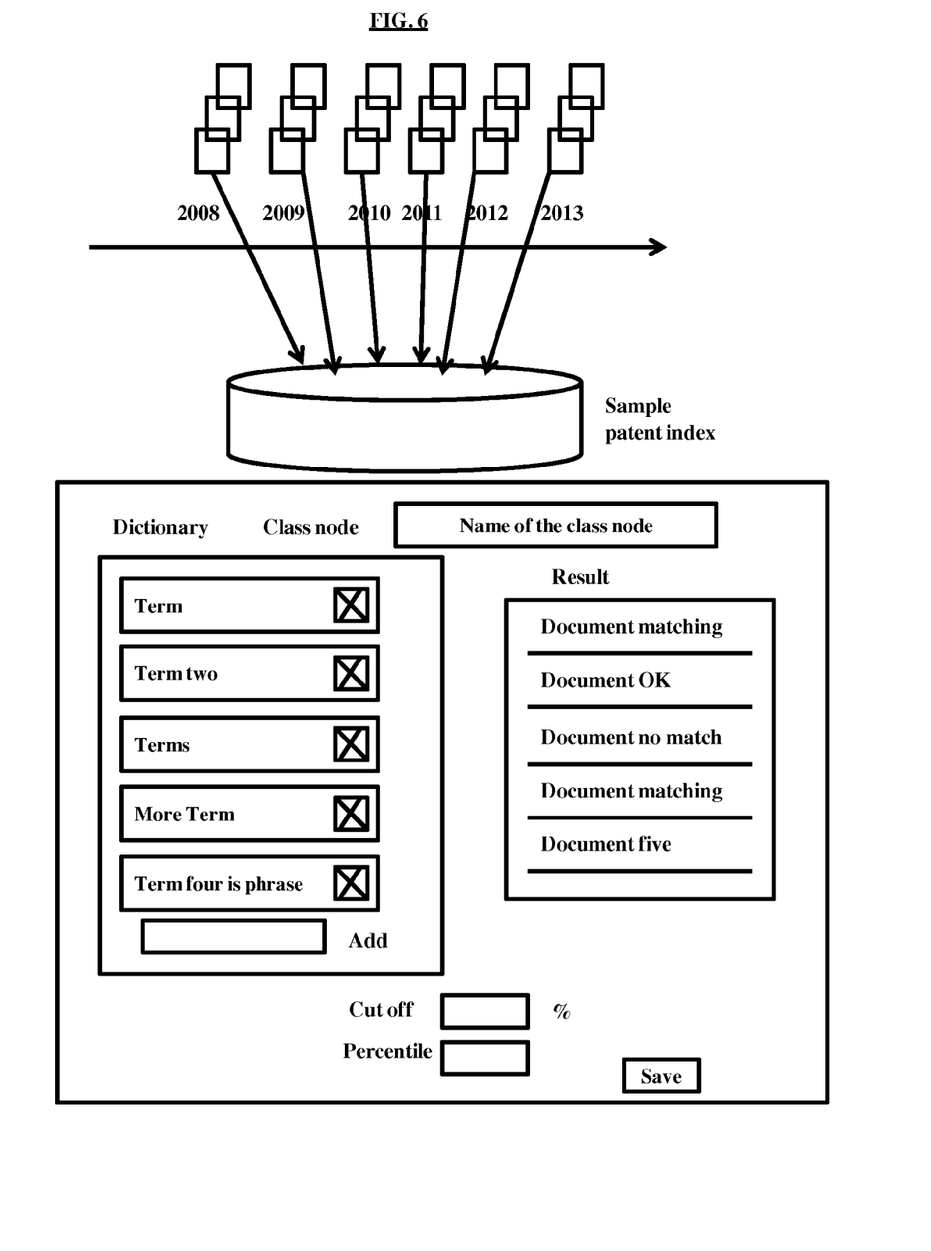
FIG. 6 shows a schematic of building a dictionary, as disclosed in the embodiments herein.

FIG. 6 shows a schematic of building a dictionary, as disclosed in the embodiments herein. As shown, the system identifies patents for previous years and indexes them. Further, it allows the user to choose a class node. The user provides terms—a term can be a group of words. Then the system tests the terms against the index. If the returned documents are satisfactory the dictionary is saved. The cutoff is provided by the user with the document during scanning that would not fall into the class node. The test button is used until a satisfactory set of documents emerge.

Figure 7:
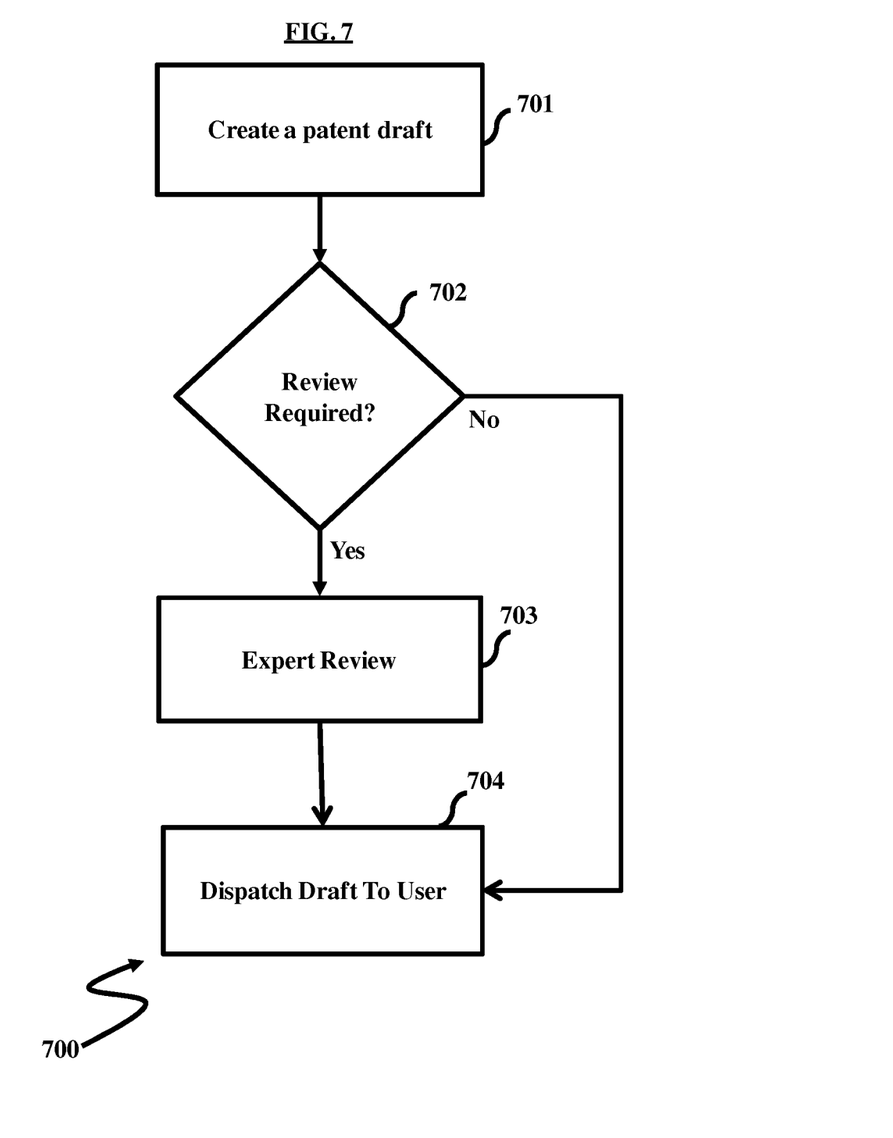
FIG. 7 is a flow diagram that shows various steps involved in the process of automatically drafting a patent specification, as disclosed in the embodiments herein.

FIG. 7 is a flow diagram that shows various steps involved in the process of automatically drafting a patent specification, as disclosed in the embodiments herein. When the user selects the drafting service, the processing server 101 initiates the preliminary patent application drafter 208 or the final patent application drafter 210, based on the inputs received from the user. The drafting tool set contains a plurality of drafting templates suitable for various patent receiving authorities such as USPTO, WIPO, EPO and so on. The drafting tool drafts a specification using the suitable template to enable the user to file the draft with the selected authority. New research and recent patents develop and employ new words to describe many new concepts and changes in the subject field ever so often. The search tool updates the new words and patterns of words and concepts from scholarly research, new product/process innovations from patent database and linking the same for each subject/field of specializations at periodic intervals or in a continuous manner. The system thus refines and brings precision to the search tool to keep abreast of changes in the subject field to incorporate the newer combinations of keywords, concepts, and technical terminologies.

The drafting tools may be used to draft various parts of the patent specification such as field of invention, brief description of invention, detailed description of invention and claims and so on, based on type of the draft. Further, the drafting tools drafts (701) the specification using the user inputs and the selected template. In a preferred embodiment, the system may search and identify prior arts that match details of a proposed invention and may copy and paste information listed under specific tags such as background, summary and so on, to specific areas in a selected template. In another embodiment, the user may manually fill information related to his/her invention under each tag such as background, summary, detailed description and so on in the selected template.

The generated draft may comprise of different sections such as description of the invention, applicable drawings and diagrams, claims and so on, depending on type of specification i.e. provisional or complete. Further, the preliminary or rough draft may serve as the inputs for generating a complete draft. In order to draft the specification from the received inputs, the processing server 101 may search in associated databases for patent and non-patent literature that matches the received input. Further, from the obtained results, the drafting tool copies data such as background, field of invention and so on and pastes on corresponding fields in a selected drafting template. In a preferred embodiment, different fields in the drafting template provided by the drafting tools may be indexed, so that the drafting tool may paste contents copied from the selected prior arts to the corresponding field in the template.

Once the patent draft is generated, the processing server 101 checks (702) whether the user has opted for an expert review. If the user opts for an expert team review, then the system sends the draft to a back-end interface 104. An expert team, proficient in the subject knowledge of the invention receives the system generated draft and evaluates and analyses (703) it to generate an error free final draft, which is then dispatched (704) to the user device 102. In an embodiment, a pre-configured nucleus can be derived automatically or semi-automatically by a training process where a set of training documents are provided to the system to learn and construct the nucleus. The documents for training may be identified by experts or may be obtained from an external or internal database that is appropriately classified. As users search for information on the system, the system can update the nuclei through various machine learning approaches available. Below example shows the process for training the system by providing training documents for a category.

Step 0: Scan all the documents in the complete population and get all the words and phrases; and their frequencies.

Step 1: Scan the documents and filter all the phrases and words and get the frequencies.

Step 2: Identify "GO" words that are more frequently occurring in the sample documents.

Step 3: Based on their frequency of occurring assign weightage.

Step 4: identify the phrases and words that are occurring in other categories and potential noise words and identify them as NOGO words and assign weightage In an embodiment, the system may allow system administrators and knowledge experts to edit one or multiple nuclei according to user preferences. This is particularly useful where machine learning is not enough or is not adequate in certain domains. Machine learning is done when new document addition does not change the nucleus significantly. There is no new GO or NOGO words being added in the system.

If the user has not selected the expert review option, then the system dispatches (704) the draft to him/her without review. User can find out the commercial use of the document/research paper by applying the nuclei. Further, user can also identify potential alternate use of the paper/document using nuclei. The nucleus/searching methodology map to the commercial or alternate use of a paper or research idea since the commercial or alternate uses have nuclei associated with it. This is used to identify the specific use. Through the machine learning capabilities, the system identifies what's new in a specific research area and suggests the user. Based on incoming queries and input text, the system can find out new concepts that user is looking for, the categories they are associated with, and thereby suggest changes in fields or categories.

In an embodiment, if there are multiple projects for which brief abstracts are available, the system can apply various nuclei and identify the commercial viability, patentability, etc. for each of the projects. Based on the matching, the projects can also be ranked based on the criteria. Each use like commercial use, patentability etc., will have their nuclei. By applying these nuclei on the abstract provides a score for these uses.

Further, in a preferred embodiment, the processing server 101 may keep a track of the databases 103 for latest developments, new patent applications, or publications and so on until a patent is granted by a registered patent office(s). The various actions in method 700 may be performed in the order presented, in a different order or simultaneously. Further, in some embodiments, some actions listed in FIG. 7 may be omitted.

Figure 8:
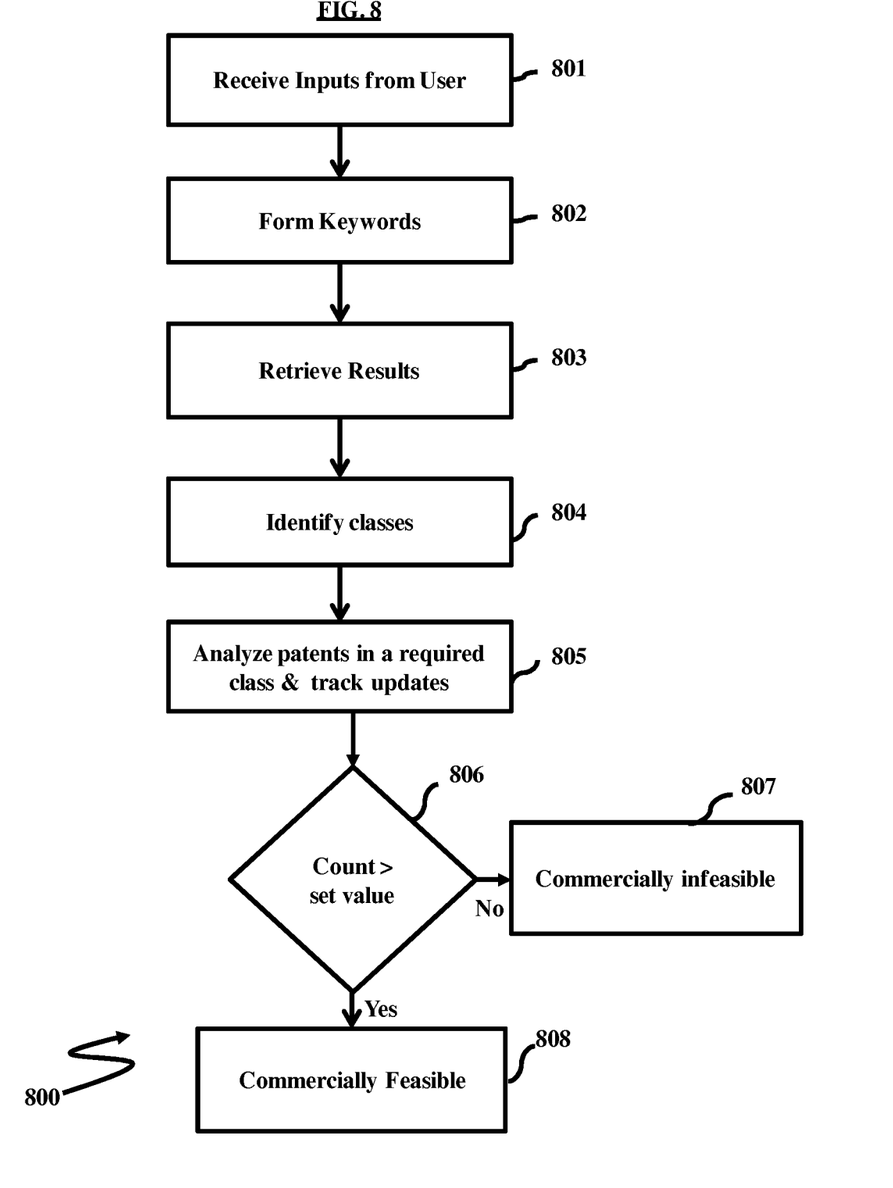
FIG. 8 is a flow diagram that shows various steps involved in the process of analyzing commercial potential of an invention, as disclosed in the embodiments herein.

FIG. 8 is a flow diagram that shows various steps involved in the process of analyzing commercial potential of an invention, as disclosed in the embodiments herein. When the user selects the research commercialization evaluation service, the processing server 101 initializes the research commercialization evaluator 209. The research commercialization evaluator 209 is a tool that accepts an existing patent, patent application or preliminary application as input and performs a detailed search in the associated databases to analyze and obtain information on companies using similar process as claimed in the input patent application, products, techniques, or technologies related to the ones contained in the input and so on. The research commercialization evaluator 209 also provides a multidimensional innovation value evaluation matrix and/or a descriptive value analysis report on request. These outputs may be used by the organization or user to evaluate the relative commercial potential of a proposed new patent. These outputs may further be used to decide whether further commercial and/or academic development is to be pursued in that particular field.

The research commercialization evaluator 209 accepts an existing patent, patent application or preliminary application as input, processes the received inputs (801) and forms (802) at least one key string based on the received inputs and additional keywords that matches the user input, identified from an associated dictionary. So as to form the key string from the received user inputs, the research commercialization evaluator 209 identifies at least one category in an associated dictionary, wherein the remaining words fall under the identified categories. In an embodiment, the nucleus for the category can be a pre-constructed query built using a combination of words and phrases that are either positively associated or negatively associated, and binary operators such as 'AND', 'OR', 'NOT' etc.

The research commercialization evaluator 209 forms a key string based on the identified class, subclasses and so on. In an embodiment, the research commercialization evaluator 209 may combine user input terms and the terms from the dictionary corresponding to the identified classes and subclasses, and identifies terms in the dictionary that are relevant to the terms present in the user input. Further, the research commercialization evaluator 209 may also consider parameters such as relationships between the terms, strength in terms of ranking and so on while framing the key string so as to ensure better/relevant search results.

The key strings are used by the server 101 to search in the associated databases 103 for retrieving (803) contents related to the present invention. In an embodiment, the keywords and the search results or the contents stored in associated database 103 are categorized into different classes by the processing server 101 based on certain criteria such as field of the invention/research, technology being used, alphabetical ordering of title of the invention/research and so on.

In another embodiment, based on the classification of the keywords, the server 101 searches (804) for the required information in different classes and subclasses in each of the databases 103. Once the required information is found in the databases 103, a search tool 205 analyzes (805) the patents and other research works found in the search process. In an embodiment, the search tool 205 keeps a track of the recent developments in the field of study of the present invention. In another embodiment, the search tool 205 may analyze certain facts and figures related to the patent which may include, the companies using similar processes, products, techniques, or technologies and/or, the number of patents issued in the present field of study of the invention, commercial success of such issued patents and so on.

Based on these parameters, the research commercialization evaluator 209 measures an activity level in that particular class(es). In another embodiment, the research commercialization evaluator 209 may consider patent and research documents filed by the user who has logged in, so as to identify the field of search and update/modify key strings to improve relevancy of search results. For example, if the research commercialization evaluator 209 identifies that the user who is requesting for a search or drafting research commercialization evaluation has filed or is having a certain number of patents in his/her name, the research commercialization evaluator 209 fetches and analyzes the patents and research work of the user and identifies the field of search of the fetched patent and non-patent literature. Further, this information also may be used to identify classes and subclasses that matches user's field of interest. Further, the research commercialization evaluator 209 checks (806) whether the activity level in the class is greater than a set value or not. In a preferred embodiment, the set value may be pre-configured by an administrator or any authorized person who manages the processing server 101. The activity level of a class may refer to number of patents/publications/working papers being filed in a particular time period and/or the number of times patents/publications/working papers listed under that particular class have been accessed/referred and used and so on. Further, a class with higher activity level may be considered commercially feasible or else is considered to have relatively higher commercial potential.

Further, by analyzing the rate of increase or decrease in the number of patents and working papers in a particular subject area and comparing it with the set value; which is periodically updated for each such subject area linked with a patent subject classification code, the research commercialization evaluator tool 209 compares, for example, but not limited to criterion such as whether the number of new patents and the numbers of working papers in that field are increasing in rate or decreasing or stay around same level, compared to other related subject fields whether proposed invention is a new patent, its research activity relative position and so on. This information ranks this research field's relative importance with other fields within the subject area and considers overall research and patenting efforts in that branch of science/technology as one of the indicators to approximate relative commercial potential and growth.

If the research commercialization evaluator 209 identifies that the activity level in that particular class is greater than the set value, then it considers (807) the invention as commercially feasible. If the research commercialization evaluator 209 identifies that the activity level in that particular class is lesser than the set value, then it considers (808) the invention as commercially infeasible. Further, based on such facts and figures, the research commercialization evaluator 209 may generate consolidated reports by projecting statistical data and/or generate a multidimensional innovation value evaluation matrix, and/or descriptive value analysis and so on. If required, an expert evaluates and gives input in combination with system generated results to evaluate the significance of this research/invention in question. The consolidated reports are then dispatched to the user. The various actions in method 800 may be performed in the order presented, in a different order or simultaneously. Further, in some embodiments, some actions listed in FIG. 8 may be omitted.

For example, consider that a scholar in an institute is performing research in a specific field/domain. The scholar may need precise information regarding prior arts in his field of research. The scholar may login to a processing server using his registered login information. Further, he may choose a search option and may provide at least one input to initiate the search. The input may be obtained in the form of an abstract, answers to questions listed in a questionnaire, phrase, paragraph and so on, that are related to the user's field of search. A search tool in the processing server then processes the received inputs and identifies at least one keyword relevant to the field of search. Further, the keywords are compared with a dictionary that is internally maintained and the search tool identifies additional keywords that match the keywords identified from the user input. The keywords in the dictionary may be linked with specific classes and subclasses in the associated databases.

Further, a key string is formed using keywords identified from the user input and the additional keywords fetched from the dictionary. Further, a search is performed in all or selected of the associated databases and information that matches the key string is fetched and displayed to the user. The search results may be sorted or organized according to user preferences and/or in the order of relevancy. Further, based on relevancy of the search results obtained, the user may decide strength of his invention/research over the prior arts, in terms of an inventive step.

Consider an example where the user has to file a patent application, which has to be drafted in a specific format that differs from one jurisdiction to other. Drafting tools associated with the processing server possesses templates suitable to file provisional and complete specification with various jurisdictions. The user may select a template of his choice. Further, the user may fill data under each section in the selected drafting template manually. The processing server may analyze the data input from the user and may search and provide prior arts that match the user inputs. This prior art information may be used for drafting the background section of the patent specification.

The processing server also provides a relative commercial potential analysis service using which the user may analyze a relative commercial potential of his invention or field of search. The system analyzes user inputs and identifies at least one class and subclass that is most relevant to the field of search or invention of the user. Further, the system measures the level of activity in the identified classes. The level of activity may be measured considering various factors such as number of patents being filed in that particular class or subclass in selected time period, number of times patents or research documents being accessed from these classes and/or subclasses in selected time period and so on. If the measured activity level is more than a set value, then the invention and/or field of search may be considered to have adequate commercial potential. Based on this analysis, the user may decide whether to continue research in that particular field or not.

The embodiments disclosed herein may be implemented through at least one software program running on at least one hardware device and performing network management functions to control the network elements. The network elements shown in FIG. 1 include blocks that may be at least one of a hardware device, or a combination of hardware device and software module.

The embodiment disclosed herein specifies a system for intellectual property management. The mechanism allows auto evaluation of commercial potential of an invention and automation of search and draft processes, providing a system thereof. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device may be any kind of device which may be programmed including e.g. any kind of computer like a server or a personal computer, or the like, or any combination thereof, e.g. one processor and two FPGAs. The device may also include means that could be e.g. hardware means like e.g. an ASIC, or a combination of hardware and software means, e.g. an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. The device may also include only software means. Alternatively, the invention may be implemented on different hardware devices, e.g. using a plurality of CPUs.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the claims as described herein.

We claim:

1. A computerized method for performing a scholarly search using a processing server, said method comprises:
   processing, by a processing module in said processing server, a search query to identify at least one of a keyword;
   identifying, by a search tool in said processing server, at least one of a class and subclass corresponding to said identified keyword;
   fetching, by said search tool in said processing server, additional words from a dictionary that matches at least one of said identified class, subclass and keyword;
   framing, by said search tool in said processing server, a key string by combining at least one of said identified keywords and said fetched additional words;
   searching, by said search tool in said processing server, in at least one of a plurality of databases using said framed key string, wherein said search is performed by constructing a nucleus for said search query and matching said nucleus with those associated with existing categories in said plurality of databases, wherein said nucleus of existing categories in said plurality of databases is a pre-defined structure defined to represent a category including data on commercial viability and one or more of:
      words having positive association with the category,
      words negatively associated with the category,
      phrases or groups of loosely coupled words that are positively associated with the category,
      phrases or group of loosely coupled words that are negatively associated with the category,
      level of appropriateness of a document,
      type of subject matter,
      meta data derived from user preferences for user specific refinement of search results; and
   sending one or more search results from among patent documents, academic publications, and working papers by said processing server for display on the user device from which the search request was received, wherein commercial viability related to a category is determined by a commercialization evaluator module by automatically analyzing activity in the category and comparing said activity level against a pre-defined threshold.

2. The method as in claim 1, wherein said nucleus for a category is a pre-constructed query built using a combination of words and phrases.

3. The method as in claim 1, wherein said nucleus is constructed by providing a set of training documents, wherein said nucleus is dynamically updated based on said search query.

4. The method as in claim 1, wherein a new category associated with said nucleus is created automatically or manually.

5. The method as in claim 1, wherein said identifying at least one of said class and subclass further comprises comparing said identified keywords with said dictionary by said search tool.

6. The method as in claim 5, wherein new keywords are added to said dictionary by said search tool to improve relevancy of search results.

7. The method as in claim 6, wherein said new keywords are automatically added to said dictionary by said search tool.

8. The method as in claim 6, wherein said new keywords are manually added to said dictionary by said search tool.

9. The method as in claim 1, wherein said key string is modified automatically based on at least one of a field of search and prior search history of said user by said search tool.

10. The method as in claim 1, wherein said plurality of databases is pre-configured with said search tool.

11. The method as in claim 1, wherein said search results are arranged in the according to a ranking order by a ranking tool.

12. The method as in claim 11, wherein said arranging the search results according to said ranking order further comprises: identifying ranking order of each of said search results by said ranking tool; and arranging said search results in at least one of an ascending or descending order of said ranking order by said search tool.

13. The method as in claim 1, wherein said search tool performs search in at least one of an internal database and an external database.

14. The method as in claim 13, wherein internal database stores working paper information.

15. The method as in claim 14, wherein said storing the working paper information further comprises:
adding said working paper information to said internal database by said processing module;
listing said added working paper information under specific category in said internal database by said processing module; and
updating said added working paper information on set time intervals by said processing module.

16. The method as in claim 15, wherein said updating the added working paper information on said set time interval is an automated process.

17. The method as in claim 15, wherein said updating the added working paper information on said set time interval is a manual process.

18. The method as in claim 15, wherein said automatically updating the added working paper information on said set time interval further comprises:
assigning a unique key to said added working paper by said processing module;
fetching updated version of said working paper on said set time interval by said processing module; and
storing said updated version under corresponding category in said internal database by said processing module.

19. The method as in claim 1, wherein said search query is at least one of an abstract, questionnaire, phrase, paragraph or technical term.

20. A computerized system for performing a scholarly search, said system comprising:
a processing server to receive and process search requests from user devices, said processing server further comprising:
a processing module for processing a search query to identify at least one of a keyword;
a search tool for:
identifying at least one of a class and subclass corresponding to said identified keyword;
fetching additional words from a dictionary that matches at least one of said identified class, subclass and keyword;
organizing said identified keywords and said fetched additional words to frame a key string;
searching in at least one of a plurality of databases using said framed search string, wherein said search is performed by constructing a nucleus for said search query and matches said nucleus with those associated with existing categories in said plurality of databases, wherein said nucleus of existing categories in said plurality of databases is a pre-defined structure defined to represent a category including data on commercial viability and one or more of:
words having positive association with the category,
words negatively associated with the category,
phrases or groups of loosely coupled words that are positively associated with the category,
phrases or group of loosely coupled words that are negatively associated with the category,
level of appropriateness of a document,
type of subject matter,
meta data derived from user preferences for user specific refinement of search results; and
sending one or more search results from among patent documents, academic publications, and working papers for display on the user device from which the search request was received, wherein commercial viability related to a category is determined by a commercialization evaluator module by automatically analyzing activity in the category and comparing said activity level against a pre-defined threshold.

21. The system as in claim 20, wherein said nucleus for a category is a pre-constructed query built using a combination of words and phrases.

22. The system as in claim 20, wherein said nucleus is constructed by providing a set of training documents, wherein said nucleus is dynamically updated based on said search query.

23. The system as in claim 20, wherein a new category associated with said nucleus is created automatically or manually.

24. The system as in claim 20, wherein said system is configured for identifying at least one of said class and subclass by comparing said identified keywords with said dictionary by said search tool.

25. The system as in claim 20, wherein said system is configured for adding new keywords to said dictionary by said search tool to improve relevancy of search results.

26. The system as in claim 24, wherein said system is configured for automatically adding new keywords to said dictionary by said search tool.

27. The system as in claim 24, wherein said system is configured for providing options to manually add new keywords to said dictionary by said search tool.

28. The system as in claim 24, wherein said system is configured for modifying said key string automatically based on at least one of an identified field of search and prior search history of said user by said search tool.

29. The system as in claim 20, wherein said system is further configured for pre-configuring said plurality of databases with said search tool.

30. The system as in claim 20, wherein said system is further configured for arranging said search results according to a ranking order by a ranking tool.

31. The system as in claim 30, wherein said system is further configured for arranging said search results according to said ranking order by:
    identifying ranking order of each of said search results by said ranking tool; and
    arranging said search results in at least one of an ascending or descending order of said ranking order by said search tool.

32. The system as in claim 20, wherein said system is configured to search in at least one of an internal database and an external database by said search tool.

33. The system as in claim 32, wherein said system is configured to store working paper information in said internal database.

34. The system as in claim 33, wherein said system is configured for storing said working paper information in said internal database by:
    adding said working paper information to said internal database by said processing module;
    listing said added working paper information under specific category in said internal database by said processing module; and
    updating said added working paper information on set time intervals by said processing module.

35. The system as in claim 34, wherein said system is configured to update the added working paper information on said set time interval automatically.

36. The system as in claim 34, wherein said system is configured to update the added working paper information on said set time interval manually.

37. The system as in claim 35, wherein said system is configured to automatically update the added working paper information on said set time interval by:
    assigning a unique key to said added working paper by said processing module;
    fetching updated version of said working paper on said set time interval by said processing module; and
    storing said updated version under corresponding category in said internal database by said processing module.

\* \* \* \* \*